H. C. WEBB.
CLEARING PLOW.
APPLICATION FILED JAN. 15, 1917.
1,226,425.
Patented May 15, 1917.
3 SHEETS—SHEET 3.
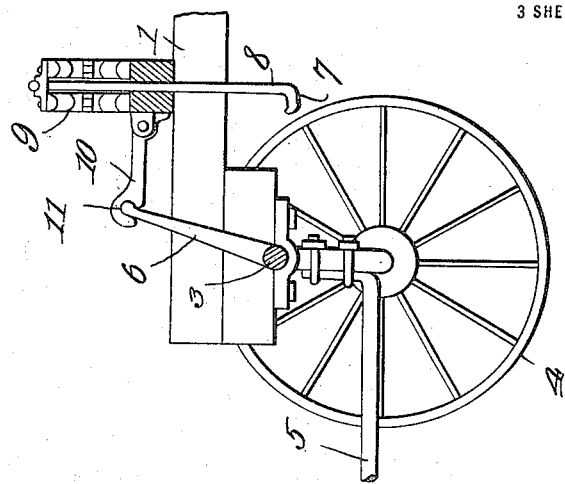
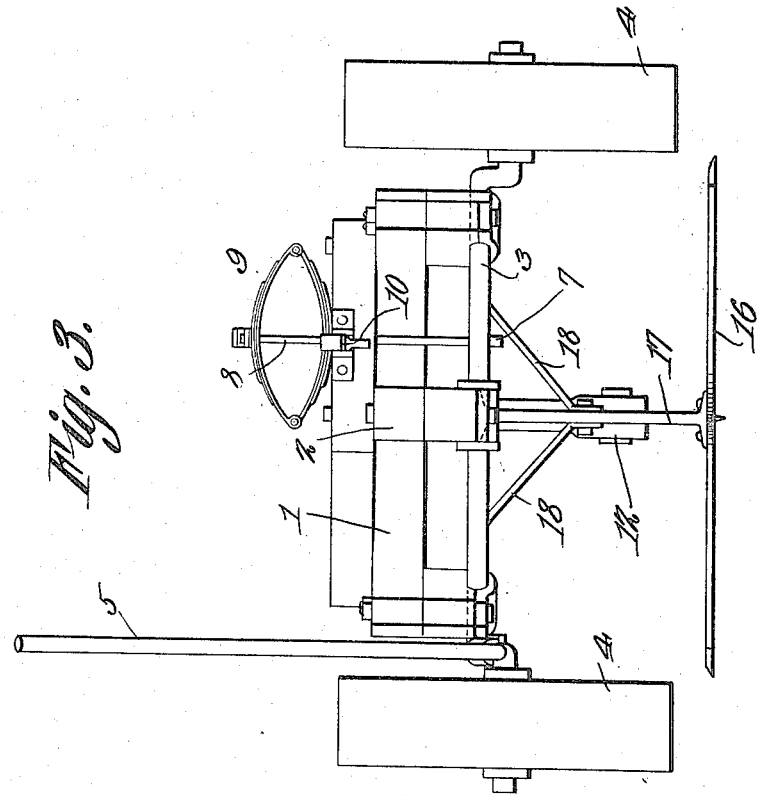
Witnesses
H. C. Webb  Inventor,
by  Attorneys.

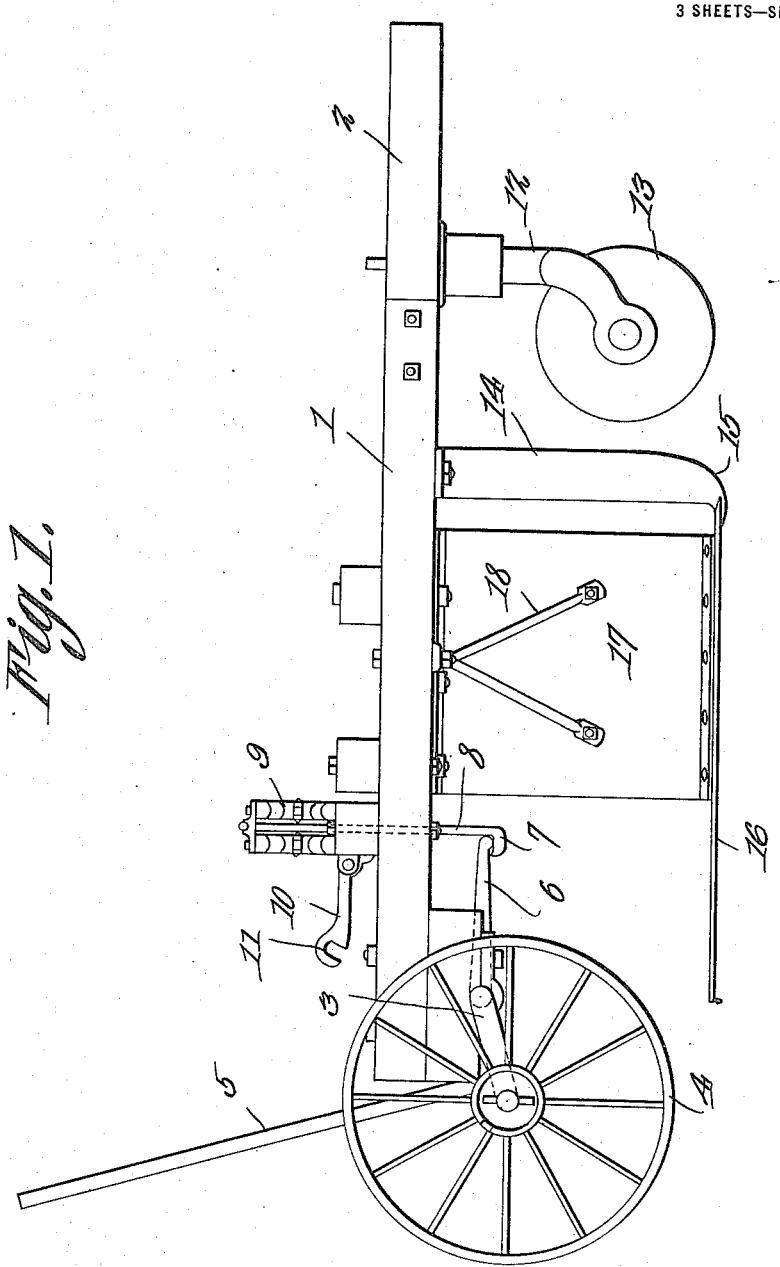

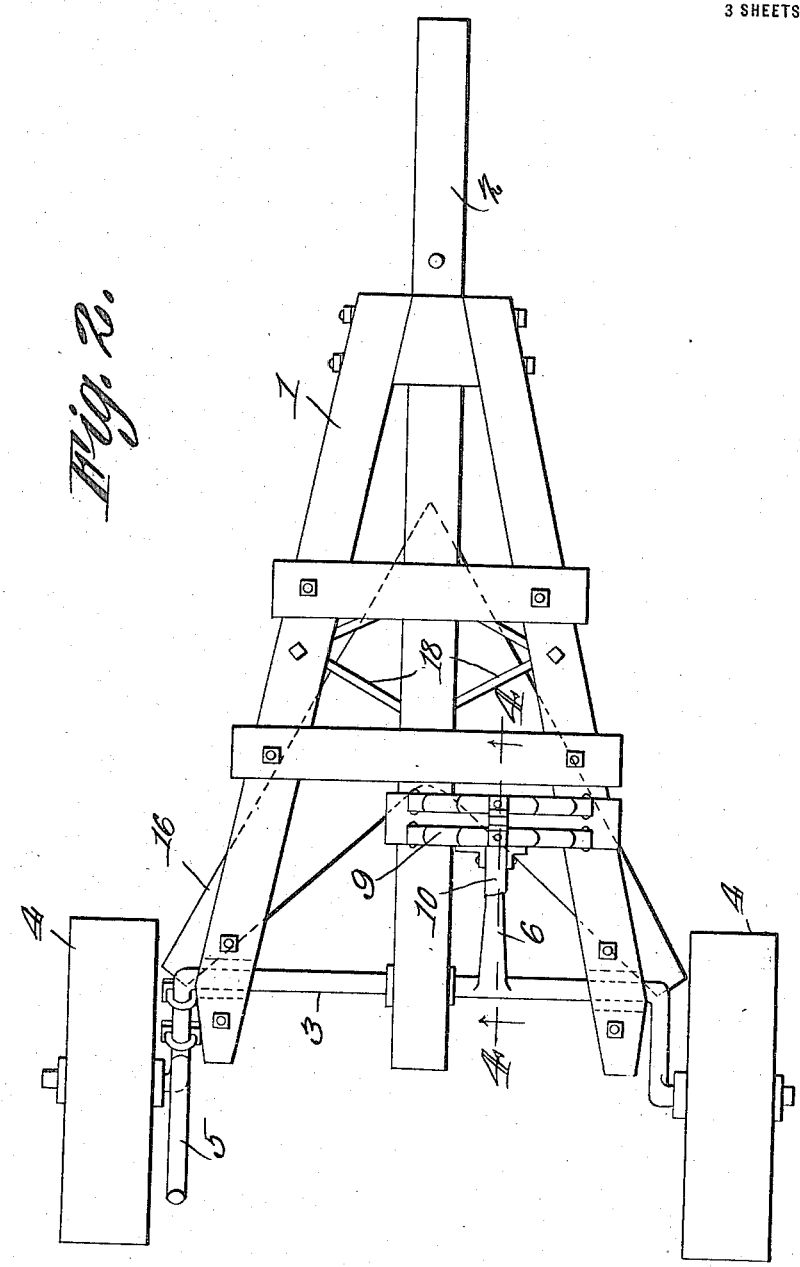

UNITED STATES PATENT OFFICE.

HENRY C. WEBB, OF BRADENTOWN, FLORIDA.

CLEARING-PLOW.

1,226,425.  Specification of Letters Patent.  Patented May 15, 1917.

Application filed January 15, 1917. Serial No. 142,502.

*To all whom it may concern:*

Be it known that I, HENRY C. WEBB, a citizen of the United States, residing at Bradentown, in the county of Manatee and State of Florida, have invented a new and useful Clearing-Plow, of which the following is a specification.

This invention relates to clearing plows especially designed for use in clearing palmetto growths by severing the thread-like roots at points below the surface of the ground so that the growths will thus be cut loose and can be readily collected by hand or in any other manner desired.

Another object of the invention is to provide simple and efficient means whereby the shearing blade of the machine will be maintained under ground without being subjected to severe strains should the wheels of the machine pass over obstructions, there being an element providing a yieldable connection between the machine and the blade to compensate for any movement occasioned in this manner.

A still further object is to provide means whereby the growths are subjected to the action of a vertical cutter in advance of the shearing blade, thereby to prevent said growths from becoming entangled with the machine.

A further object is to combine with the machine a rotary cutter particularly designed for use where the machine is traveling over soft spongy ground containing palmetto growths.

A still further object is to provide apparatus of this character which can be quickly adjusted so as to raise and lower the shearing blades, means being employed for locking said blades in their elevated positions, thus to allow the machine to be drawn readily from place to place without acting on the soil.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the machine, the shearing blades being shown lowered to active position.

Fig. 2 is a top plan view.

Fig. 3 is a rear elevation.

Fig. 4 is a section on line 4—4 Fig. 2.

Referring to the figures by characters of reference 1 designates a frame which is preferably triangular and from which extends a draft tongue 2 which is fixed relative to the frame. The rear portion of the frame is mounted upon an arched axle 3 engaging supporting wheels 4 and extending from one end of this arched axle is a lever 5 whereby the axle can be rotated, thus to raise and lower the frame.

Extending from the arched axle is an arm 6 designed to bear downwardly on a stirrup 7 carried by a rod 8 which is arranged vertically within the frame and is attached at its upper end to a cushioning spring 9 of any desired form and which spring is mounted on the frame.

A latch 10 is pivotally connected to the frame and is supported in the path of the end of arm 6, this latch being provided with a recess 11 designed to receive the end of the arm and thus hold said arm against swinging movement in either direction, thereby to hold the frame 1 elevated and the arms of the arched axle substantially vertical. This position of the parts has been illustrated in Fig. 4.

Connected to the front portion or apex of the frame 1 is a forked stem 12 mounted for rotation about a substantially vertical axis and connected to a cutting disk 13. Secured to the frame and back of this cutting disk is a vertical blade or colter 14 the lower cutting edge of which is curved downwardly and rearwardly as at 15. The lower end of this blade is connected to or formed with the front or apex portion of a V-shaped cutting element 16 attached to the lower end of a flat standard 17 the upper end of which is secured to the frame 1 at the center thereof. Upwardly converging braces 18 connect the sides of the standard to the sides of the frame, thus to hold the blade 16 fixed relative to the frame.

Under ordinary conditions, the machine can be drawn over the ground without causing the blade 16 or the colter 14 to cut into the soil. Under these conditions the lever 5 is extended rearwardly and the arm 6 is in engagement with the latch 10, as shown in Fig. 4. Therefore the rear portion of the frame 1 is lifted and the colter 14 and blade 16 will be supported above the ground. When it is desired to use the machine for cutting the roots of palmetto below the surface of the ground, the latch 10 is raised and arm 6 caused to swing forwardly and downwardly until it strikes the stirrup 7. Thus the lower portion of the colter 14 will cut into the soil and the blade 16 will follow the same and ultimately be brought to a position below and substantially parallel with the surface of the ground. These relative positions of the parts have been shown in Fig. 1. The machine is then drawn forward and the rotary cutter 13 will cut through the growths in the path thereof, this being particularly useful in soft or spongy soil. The colter 14 will likewise cut through the upstanding growths and cut into the surface of the soil, thereby severing the roots vertically close to the surface of the ground. The colter 14 is followed by the blade 16 which operates to shear off the roots at points under the ground so that the brush will thus be fully separated from the ground and can be readily gathered by hand or by any suitable means provided for that purpose. Should one of the wheels 4 ride over an obstruction the frame 1, which would thus be lifted, under ordinary conditions, will not pull upwardly on the blade 16 but, instead, the arm 6 would thrust downwardly on the stirrup 7, thereby placing spring 9 under compression. Therefore the danger of breaking the blade 16 as a result of the variation in the distance between the plane of said blade and the surface on which the wheels rest, will not result in injury to the blade 16 or any other part of the machine.

What is claimed is:—

1. A clearing plow including a frame, a cutting blade carried thereby and movable therewith, a wheel supported arched axle connected to the frame and mounted for rotation, means for rotating the axle to raise and lower the frame, cushioning means carried by the frame, means upon the axle and coöperating with the cushioning means for limiting the rotation of the axle in one direction and the consequent lowering of the frame, and a latch member carried by the frame for engaging said means to hold the axle against rotation when the frame is elevated.

2. A clearing plow including a frame, a substantially horizontal cutting blade fixedly connected thereto and movable therewith, a wheel supported arched axle connected to and revoluble upon the frame, means for rotating the axle to raise and lower the frame, coöperating means upon the axle and frame for locking the frame in elevated position, a yieldingly supported stirrup connected to the frame, and means revoluble with the axle and movable against the stirrup to limit the downward movement of the frame and the rotation of the axle in one direction.

In testimony that I claim the foregoing as my own, I have hereto affixed my signature in the presence of two witnesses.

HENRY C. WEBB.

Witnesses:
H. F. WYMAN,
LAURA WYMAN.

Copies of this patent may be obtained for five cents each, by addressing the "Commissioner of Patents. Washington, D. C."